United States Patent
Bretz et al.

(10) Patent No.: US 11,179,835 B2
(45) Date of Patent: Nov. 23, 2021

(54) CALIPER PISTON TOOL

(71) Applicant: FEEDBACK SPORTS LLC, Golden, CO (US)

(72) Inventors: Michael Bretz, Fairfax, CA (US); Dominic Lovely, Golden, CO (US); William E. Allen, III, Golden, CO (US)

(73) Assignee: FEEDBACK SPORTS LLC, Golden, CO (US)

( * ) Notice: Subject to any disclaimer, the term of this patent is extended or adjusted under 35 U.S.C. 154(b) by 0 days.

(21) Appl. No.: 17/071,800

(22) Filed: Oct. 15, 2020

(65) Prior Publication Data

US 2021/0114190 A1    Apr. 22, 2021

Related U.S. Application Data

(60) Provisional application No. 62/915,743, filed on Oct. 16, 2019, provisional application No. 63/038,526, filed on Jun. 12, 2020.

(51) Int. Cl.
*B25B 27/00* (2006.01)
*F16D 65/00* (2006.01)

(52) U.S. Cl.
CPC ...... *B25B 27/0035* (2013.01); *F16D 65/0043* (2013.01)

(58) Field of Classification Search
CPC ................................................ F16D 65/0043
USPC ........................................................ 29/239
See application file for complete search history.

(56) References Cited

U.S. PATENT DOCUMENTS

| | | | |
|---|---|---|---|
| 8,505,177 B2 * | 8/2013 | Chen | B25B 5/068 29/270 |
| 2012/0266428 A1 * | 10/2012 | Hodges | B25B 27/0035 29/239 |
| 2018/0017114 A1 * | 1/2018 | Lahar | B60T 17/221 |

OTHER PUBLICATIONS

Summit Racing Equipment; Lisle Quick Quad Pad Spreaders 29100; https://www.summitracing.com/parts/lil-29100?seid=srese1&gclid=CjwKCAjw5p_8BRBUEiwAPpJO6yF4LBgiRzb3wDzgBYgkp2u7tysfWy6FigXT-DY1sbLQ3suwPHO49hoCMI4QAvD_BwE Accessed Oct. 15, 2020.

* cited by examiner

*Primary Examiner* — Lee D Wilson
*Assistant Examiner* — Jonathan G Santiago Martinez
(74) *Attorney, Agent, or Firm* — Holzer Patel Drennan

(57) ABSTRACT

In order for hydraulic disk brakes to function properly over time, associated brake pads are changed periodically. In order to exchange old brake pads for replacement brake pads, a disk brake may require pushing back the brake pistons within a brake caliper body in order to make room for installation of replacement pads. Current tools and methods typically require removal of a wheel from a vehicle, removal of a brake rotor from the wheel, and/or removal of the brake caliper body from a rotor. The presently disclosed caliper piston tool allows brake pads to be replaced without dismantling various components of the vehicle, resulting in significant time and cost savings as well as convenience for do-it-yourself and professional mechanics alike.

20 Claims, 5 Drawing Sheets

CALIPER PISTON TOOL

CROSS-REFERENCE TO RELATED APPLICATIONS

The present application claims benefit of priority to U.S. Provisional Patent Application No. 62/915,743, entitled "Bicycle Caliper Press and Method of Using the Same," and filed on Oct. 16, 2019, which is specifically incorporated by reference herein for all that it discloses or teaches. The present application further claims benefit of priority to U.S. Provisional Patent Application No. 63/038,526, entitled "Caliper Piston Tool" and filed on Jun. 12, 2020, which is also specifically incorporated by reference herein for all that it discloses or teaches.

BACKGROUND

Some modern bicycles have hydraulic disk brakes. In order for these brakes to function properly the brake pads must be changed once they are worn beyond a certain point. The brake pads (also referred to as brake pad assemblies when the brake pads are combined with other elements in a unitary package) are positioned within a brake caliper body. In order to exchange the old brake pads for new ones a disk brake may require pushing back the brake pistons within the brake caliper body in order to make room for installation of replacement pads. Current tools and methods typically require removal of the wheel from the bicycle and/or removal of the brake caliper body from the bicycle. Not only are current tools and methods time intensive, inaccurate, and/or cause piston damage, they also often require realignment of the entire brake system following brake pad replacement, which can further add to brake maintenance costs.

SUMMARY

Implementations described and claimed herein address the foregoing problems by providing a caliper piston tool comprising a first handle including a guide track and a first paddle fixed in position on the first handle, a second handle to pivot about the first handle at a handle joint, the second handle including a drive finger fixed in position on the second handle, and a second paddle. The second paddle includes a drive socket, wherein the drive finger is engaged within the drive socket, and a guide follower constrained to linear motion along the guide track, wherein rotation of the drive finger about the handle joint drives a linear motion of the guide follower along the guide track.

Implementations described and claimed herein address the foregoing problems by further providing a method of using a caliper piston tool comprising inserting a first paddle and a second paddle between a pair of opposing caliper pistons, the first paddle fixed in position on a first handle, the first handle including a guide track; and compressing the first handle and a second handle together, the second handle to pivot about the first handle at a handle joint, and the second handle including a drive finger fixed in position on the second handle. The second paddle includes a drive socket, wherein the drive finger is engaged within the drive socket, and a guide follower constrained to linear motion along the guide track, wherein rotation of the drive finger about the handle joint drives a linear motion of the guide follower along the guide track and separation of the first paddle and the second paddle in response to the compressing operation.

Other implementations are also described and recited herein.

BRIEF DESCRIPTIONS OF THE DRAWINGS

DETAILED DESCRIPTIONS

The presently disclosed technology allows brake pads to be replaced without dismantling a bicycle, resulting in significant time and cost savings as well as convenience for do-it-yourself and professional mechanics alike. While the description herein is directed explicitly to disk brakes for bicycles, the caliper piston tool may also be used on disk brakes for other vehicles (e.g., motorcycles, scooters, automobiles, all-terrain vehicles (ATVs), side-by-sides (S×S), and electric mobility vehicles).

Figure 1A:
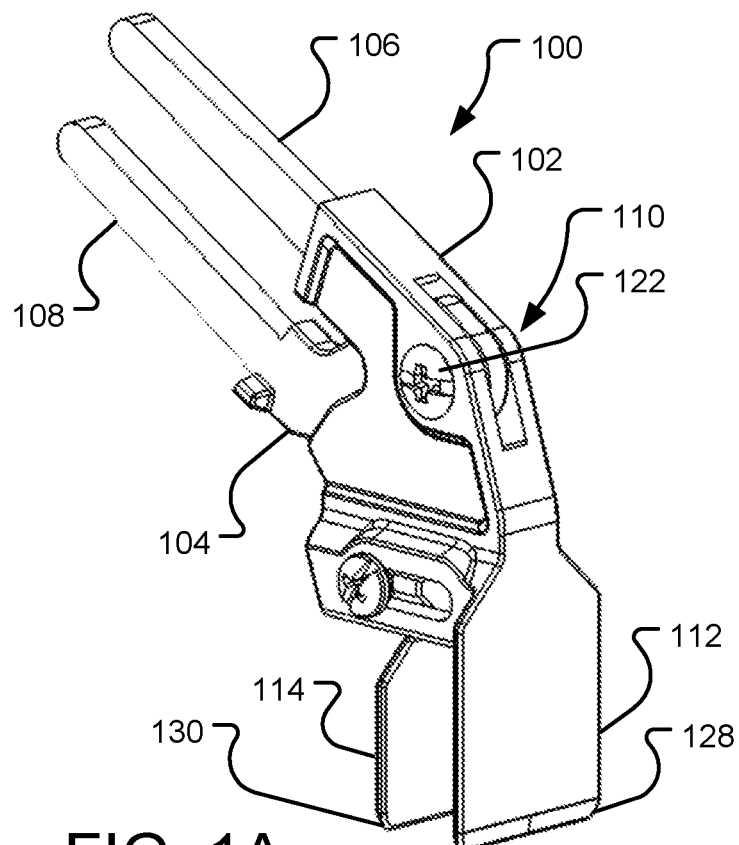
FIG. 1A illustrates a first perspective view of an example caliper piston tool.
Figure 1B:
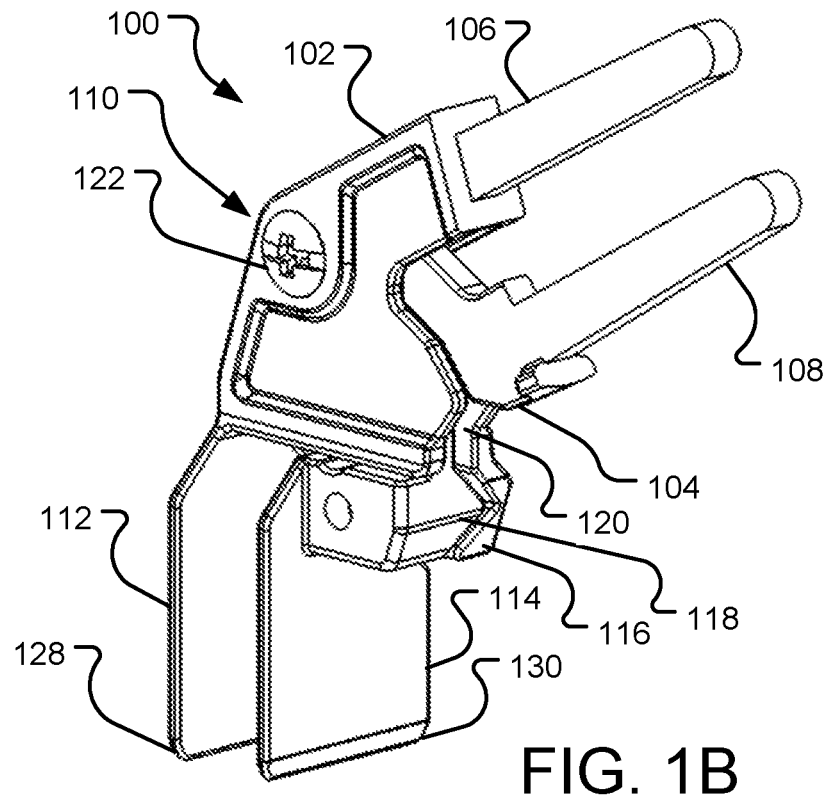
FIG. 1B illustrates a second perspective view of the example caliper piston tool of FIG. 1A.

FIG. 1A illustrates a first perspective view of an example caliper piston tool 100. FIG. 1B illustrates a second perspective view of the example caliper piston tool 100 of FIG. 1A. The tool 100 includes a first handle 102 (which, in turn, includes a first paddle 112), a second handle 104, and a second paddle 114. The first handle 102 includes a first handle grip 106 extending in a first general direction away from a handle joint 110. The first handle grip 106 may function as a first lever arm for a user to operate the tool 100.

The first handle 102 further includes a first paddle 112 that extends in a second general direction away from the handle joint 110. The first paddle 112 forms a flush front face of the tool 100, as shown in FIG. 1A. In other implementations, another portion of the first handle 102 or other component of the tool 100 extends beyond the first paddle 112 at the depicted front of the tool 100 illustrated in FIG. 1A. The first paddle 112 is a thin, rigid, and generally flat structure that may in conjunction with a second paddle 114, which is also a thin, rigid, and generally flat structure be wedged between a pair of brake pads to mechanically separate the brake pads for inspection, removable, and/or replacement. The paddles 112, 114 each includes chamfered leading edges 128, 130, respectively, that aid a user in inserting the paddles 112, 114 between the pair of brake pads. The first handle 102 still further includes a guide track 116 that serves to constrain motion of the second paddle 114 to linear motion along the guide track 116. The second paddle 114 includes a guide follower 118 that fits within, onto, and/or over the guide track 116, and serves to define the linear motion along the guide track 116.

The second handle 104 includes a second handle grip 108 extending in a third general direction away from the handle joint 110. The second handle grip 108 may function as a second lever arm for the user to operate the tool 100. Specifically, the user may compress the handle grips 106, 108 together to drive the paddle 112, 114 apart. Similarly, the user may separate the handle grips 106, 108 together to bring the paddles 112, 114 together. The handle grips 106, 108 may each include a rubberized coating, knurling, or other texture to enhance the user's comfort and level of grip applied to the handle grips 106, 108. Further, the handle grips 106, 108 can be fitted with molded grips, sprayed or dipped with a non-slip or texturized coating, or left bare to be used with gloves.

The handle joint 110 constrains motion of the second handle 104 with reference to the first handle 102 to rotation about the handle joint 110. Each of the handles 102, 104 include an aperture (not shown) that are aligned. A mechanical fastener 122 (e.g., a rivet, cotter pin/cotter bolt, screw/threaded aperture, bolt/bushing/nut) having a shaft extends through the apertures. The mechanical fastener shaft and apertures form a plain bearing at the handle joint 110. Other implementations may include other types of bearings at the handle joint 110.

Here, the first handle 102 is a split structure at the handle joint 110 and the guide track 116 to accommodate the second handle 104 within a receiving slot 120 formed by the split first handle 102. This serves to further secure the second handle 104 to the first handle 102 and limit the movement of the second handle 104 with reference to the first handle 102 to rotation about the handle joint 110. Other implementations of the first handle 102 may not include the split structure or the receiving slot 120 and rotation of the second handle 104 with reference to the first handle 102 may be constrained merely by the handle joint 110 (or other features of the tool 100).

The second handle 104 further includes a drive finger (not shown, see e.g., drive finger 224 of FIGS. 2A & 2B) extending in a fourth general direction away from the handle joint 110 and oriented within the receiving slot 120. The drive finger engages a drive socket (also not shown, see e.g., drive socket 226 of FIGS. 2A & 2B) in the guide follower 118 on the second paddle 114. This permits rotation of the second handle grip 108 about the handle joint 110 to drive a similar rotation of the drive finger. The rotation of the drive finger drives a linear motion of the drive socket in the guide follower 118 along the guide track 116, which yields a similar linear motion of the second paddle 114 with reference to the first paddle 112. In other implementations, the drive finger/drive socket is visible on the outside of the tool 100. Further, a pair of drive fingers/drive sockets may be located on both sides of the tool 100.

The guide track 116 is a v-shaped depression in the first handle 102 running parallel with a desired linear motion of the second paddle 114 with reference to the first paddle 112. The guide follower 118 is a similarly v-shaped protrusion in the second paddle 114 that fits in the guide track 116. A result is that movement of the second paddle 114 with reference to the first paddle 112 is limited to a single linear direction running parallel with the v-shaped depression in the first handle 102 and the v-shaped protrusion in the second paddle 114. Other shapes and orientations of the guide track/guide follower are contemplated herein that limit movement of the second paddle 114 with reference to the first paddle 112 to a single linear direction. For example, the guide track/guide follower can be any corresponding combination of matching shapes that are constrained to movement in a singular linear direction. More specifically, the guide track may be an aperture and the guide follower may be a protrusion of a similar slightly smaller shape (e.g., matching circular, square, star or hexagon cross-sectional shapes).

In various implementations, the first handle grip 106, the first paddle 112, the guide track 116, and the receiving slot 120 are all features of the first handle 102 that are all structurally contiguous and fixed in position on the first handle 102. Similarly, the second handle grip 108 and the drive finger are both features of the second handle 104 that are structurally contiguous and fixed in position on the second handle 104. Similarly, the guide follower 118 and the drive socket are structurally contiguous and fixed in position on the second paddle 114.

In various implementations, the first handle 102, the second handle 104, and the second paddle 114 may each be made of various metal alloys and/or durable hard plastics, for example. Further, the components of the tool 100 that come in direct contact with brake system components are the paddles 112, 114. These components may be specially coated, for example with rubber, or chrome finished in order to protect the brake components that they come in contact with.

Figure 2A:
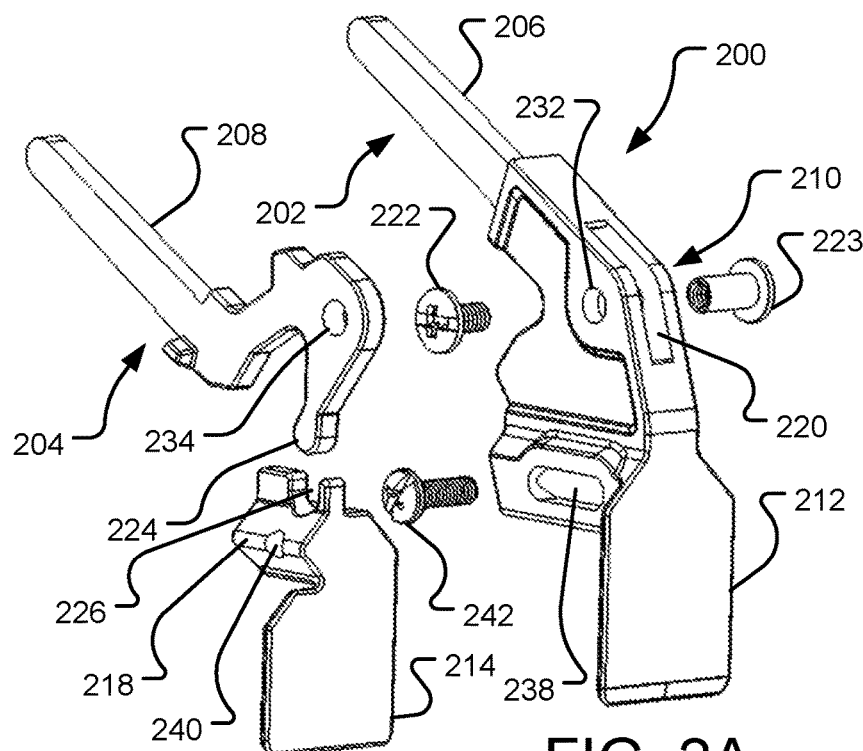
FIG. 2A illustrates a first perspective exploded view of an example caliper piston tool.
Figure 2B:
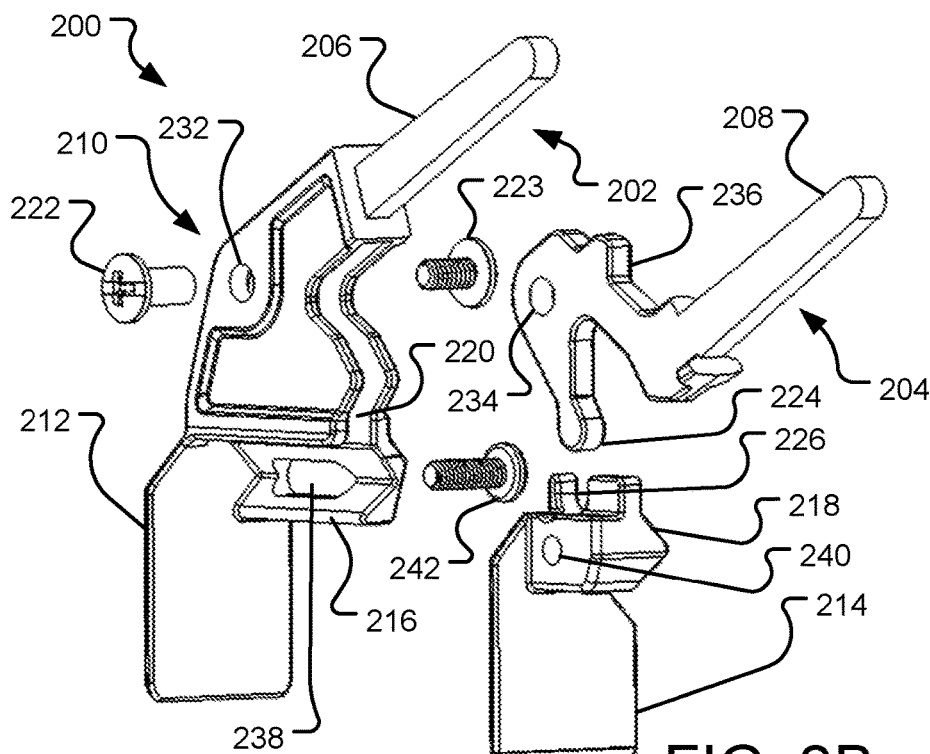
FIG. 2B illustrates a second perspective exploded view of the example caliper piston tool of FIG. 2A.

FIG. 2A illustrates a first perspective exploded view of an example caliper piston tool 200. FIG. 2B illustrates a second perspective exploded view of the example caliper piston tool 200 of FIG. 2A. The tool 200 includes a first handle 202 (which, in turn, includes a first paddle 212), a second handle 204, and a second paddle 214. The first handle 202 includes a first handle grip 206 extending in a first general direction away from a handle joint 210.

The first handle 202 further includes a first paddle 212 that extends in a second general direction away from the handle joint 210. The first handle 202 still further includes a guide track 216 that serves to constrain motion of the second paddle 214 to linear motion along the guide track 216. The second paddle 214 includes a guide follower 218 that fits within, onto, and/or over the guide track 216, and serves to define the linear motion along the guide track 216.

The second handle 204 includes a second handle grip 208 extending in a third general direction away from the handle joint 210. The handle joint 210 constrains motion of the second handle 204 with reference to the first handle 202 to rotation about the handle joint 210. The handles 202, 204 include apertures 232, 234, respectively, that are aligned and a mechanical fastener (here, bolt 222 and nut 223) extends therethrough. This forms a plain bearing at the handle joint 210. Other implementations may include other types of mechanical fasteners and bearings at the handle joint 210.

Here, the first handle 202 is a split structure at the handle joint 210 and the guide track 216 to accommodate the second handle 204 within a receiving slot 220 formed by the split first handle 202. This serves to further secure the second handle 204 to the first handle 202 and limit the movement of the second handle 204 with reference to the first handle 202 to rotation about the handle joint 210. Other implementations of the first handle 202 may not include a split structure or the receiving slot 220 and rotation of the second handle 204 with reference to the first handle 202 may be constrained merely by the handle joint 210 (or other features of the tool 200).

The second handle 204 further includes a drive finger 224 extending in a fourth general direction away from the handle joint 210 and oriented within the receiving slot 220. The drive finger 224 engages a drive socket 226 in the guide follower 218 on the second paddle 214. This permits rotation of the second handle grip 208 about the handle joint 210 to drive a similar rotation of the drive finger 224. The rotation of the drive finger 224 drives a linear motion of the drive socket 226 in the guide follower 218 along the guide track 216, which yields a similar linear motion of the second paddle 214 with reference to the first paddle 212.

The guide track 216 is a v-shaped depression in the first handle 202 running parallel with a desired linear motion of the second paddle 214 with reference to the first paddle 212. The guide follower 218 is a similarly v-shaped protrusion in the second paddle 214 that fits in the guide track 216. A result is that movement of the second paddle 214 with reference to the first paddle 212 is limited to a single linear direction running parallel with the v-shaped depression in the first handle 202 and the v-shaped protrusion in the second paddle 214. Other shapes and orientations of the guide track/guide follower are contemplated herein that limit movement of the second paddle 214 with reference to the first paddle 212 to a single linear direction.

The second handle 204 further includes a handle stop 236 that limits compression of the handle grips 206, 208, thus limiting a distance that the user may drive the paddles 212, 214 apart. More specifically, the handle stop 236 comes in contact with the first handle 202 when the user brings the handle grips 206, 208 together, preventing the handle grips 206, 208 from being further compressed together. While the handle stop 236 is oriented on the second handle 204 in FIG. 2, in other implementations, the handle stop 236 may be oriented in a similar position on the first handle 202 or there may be matching handle stops on each of the handles 202, 204. Further, the handle stop 236 may be adjustable in position or size to vary the distance that the user may drive the paddles 212, 214 apart to achieve a predetermined desired separation distance of the paddles 212, 214. For example, the location and/or size of the handle stop 236 may be adjusted to either increase or decrease the spreadable range of the paddles 212, 214, depending in part on what size of brake system the caliper piston tool 200 is being used on. In other implementations, the handle stop 236 is or includes a biasing element (e.g., a spring) that biases the handle grips 206, 208 open or closed.

The tool 200 also includes a friction adjuster that is made up of a track aperture 238, a follower aperture 240, and a friction fastener 242. The friction fastener 242 extends through aligned apertures 238, 240 and is used to adjust a tolerance between the guide track 216 and the guide follower 218. The tolerance defines the ease at which the handle grips 206, 208 are moved by a user, and whether the handle grips 206, 208 are capable of moving on their own by force of gravity (e.g., by falling open or closed). In the implementation of FIG. 2, the track aperture 238 is slotted to allow for the friction fastener 242 to be selectively positioned within the track aperture 238. Further, the follower aperture 240 is threaded to permit the friction fastener 242 to screw into the follower aperture 240. The follower aperture 240 may include a thread-locking mechanism or substance to hold the friction fastener 242 in place and not inadvertently screwing in or out of the follower aperture 240. Other implementations may utilize a bolt/nut combination rather than the threaded follower aperture 240 in a similar fashion.

In various implementations, the first handle grip 206, the first paddle 212, the guide track 216, track aperture 238, and the receiving slot 220 are all features of the first handle 202 that are all structurally contiguous and fixed in position on the first handle 202, as shown in FIGS. 2A & 2B. Similarly, the second handle grip 208, the drive finger 224, and the handle stop 236 are all features of the second handle 204 that are all structurally contiguous and fixed in position on the second handle 204, as shown in FIGS. 2A & 2B. Similarly, the guide follower 218, follower aperture 240, and the drive socket 226 are structurally contiguous and fixed in position on the second paddle 214, as shown in FIGS. 2A & 2B.

Figure 3:
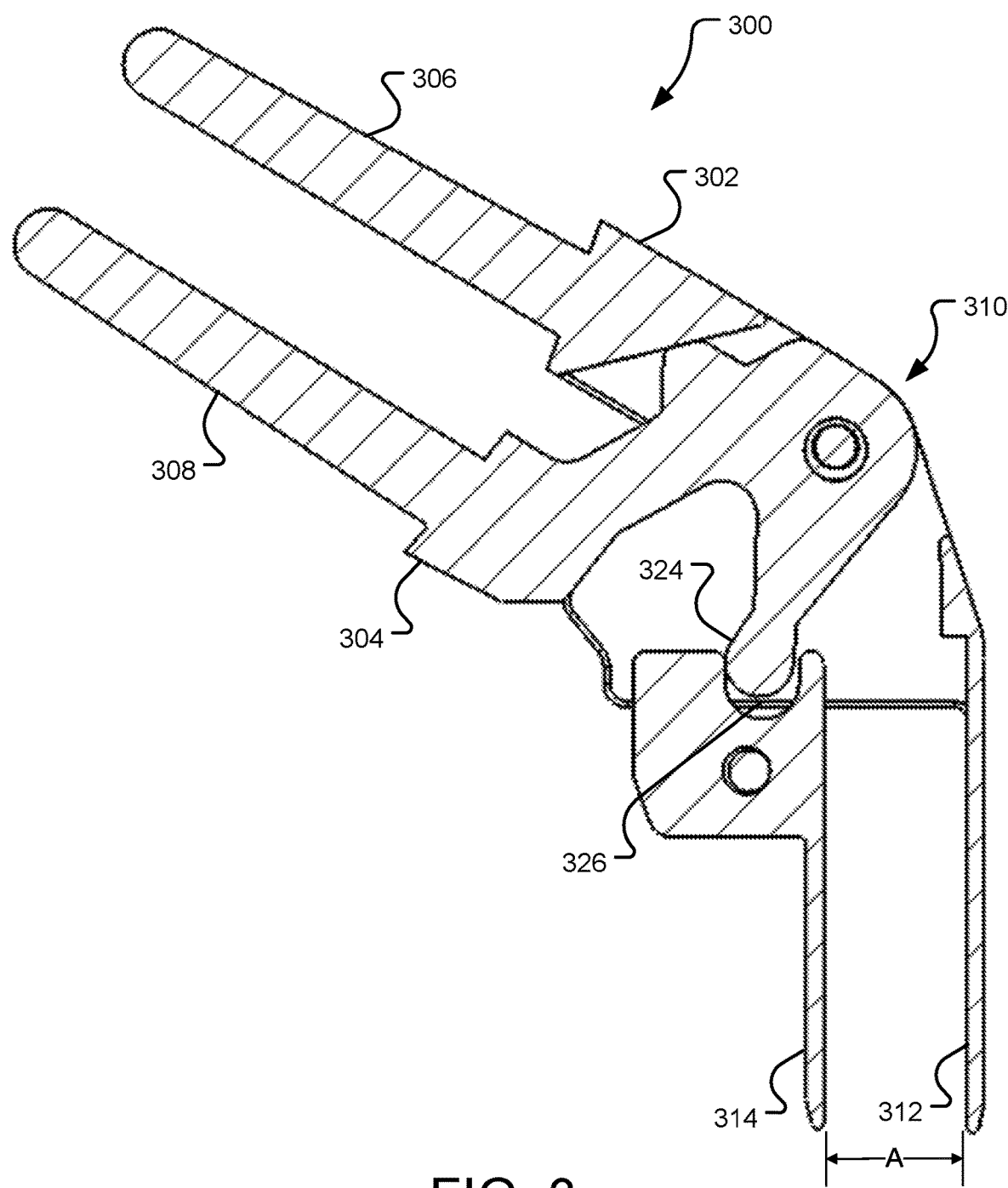
FIG. 3 illustrates a cross sectional view of an example caliper piston tool in an open position.

FIG. 3 illustrates a cross sectional view of an example caliper piston tool 300 in an open position. The tool 300 includes a first handle 302 (which, in turn, includes a first paddle 312), a second handle 304, and a second paddle 314. The first handle 302 includes a first handle grip 306 extending in a first general direction away from a handle joint 310. The first handle 302 further includes the first paddle 312 that extends in a second general direction away from the handle joint 310. The first handle 302 still further includes a guide track (not shown) that serves to constrain motion of the second paddle 314 to linear motion along the guide track. The second paddle 314 includes a guide follower (not shown) that fits within, onto, and/or over the guide track, and serves to define the linear motion along the guide track.

The second handle 304 includes a second handle grip 308 extending in a third general direction away from the handle joint 310. The handle joint 310 constrains motion of the second handle 304 with reference to the first handle 302 to rotation about the handle joint 310. The second handle 304 further includes a drive finger 324 extending in a fourth general direction away from the handle joint 310 and oriented within a receiving slot (not shown) of the tool 300. The drive finger 324 engages a drive socket 326 in the guide follower on the second paddle 314. This permits rotation of the second handle grip 308 about the handle joint 310 to drive a similar rotation of the drive finger 324. The rotation of the drive finger 324 drives a linear motion of the drive socket 326 in the guide follower along the guide track, which yields a similar linear motion of the second paddle 314 with reference to the first paddle 312.

To achieve the depicted open position, a user may manipulate the second handle grip 308 towards the first handle grip 306, which will cause rotation of the second handle 304 about the handle joint 310 and the drive finger 324, affixed to the second handle 304, to rotate down and forward inside the drive socket 326. This causes the guide follower to move backwards or proximally toward the handle side of the caliper piston tool 300 and the second paddle 314 that is affixed to the guide follower to move away from the first paddle 312. Generally, the closer the handle grips 306, 308 are to one another, the farther the paddles 312, 314 will be from one another. Conversely, the further the handle grips 306, 308 are from one another, the closer the paddles 312, 314 will be to one another.

In various implementations, the paddles 312, 314 each include an 25 mm×25 mm flat area and are each 1.5 mm thick. Further, an opening A between the paddles 312, 314 when the tool 300 is in the open position of FIG. 3 may be limited to 12 mm. Further, the handle grips 306, 308 may each be 50 mm-100 mm long. A distance from a proximal end of the handle grips 306, 308 to a front face of the tool 300 may be 32 mm, and the first paddle 312 may be flush with the front face of the tool 300, or inset 9 mm from the front face of the tool 300. Dimensions provided for the tool 300 are examples only, other dimensions are contemplated herein. Further, all dimensions provided for the tool 300 are approximate. Approximately within the meaning of the present application is +/−10% of the given dimension.

Figure 4:
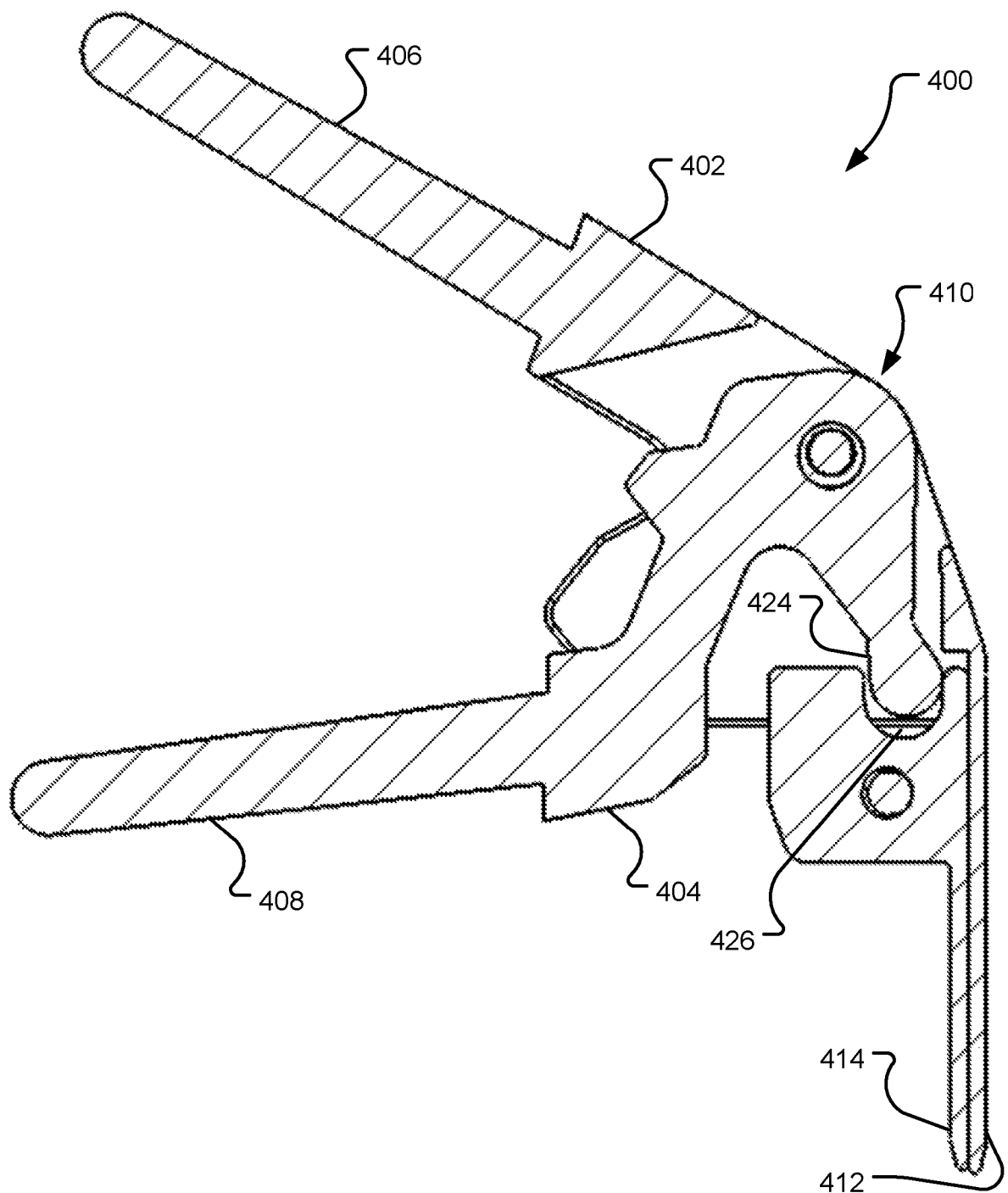
FIG. 4 illustrates a cross sectional view of an example caliper piston tool in a closed position.

FIG. 4 illustrates a cross sectional view of an example caliper piston tool 400 in a closed position. The tool 400 includes a first handle 402 (which, in turn, includes a first paddle 412), a second handle 404, and a second paddle 414. The first handle 402 includes a first handle grip 406 extending in a first general direction away from a handle joint 410. The first handle 402 further includes the first paddle 412 that extends in a second general direction away from the handle joint 410. The first handle 402 still further includes a guide track (not shown) that serves to constrain motion of the second paddle 414 to linear motion along the guide track. The second paddle 414 includes a guide follower (not shown) that fits within, onto, and/or over the guide track, and serves to define the linear motion along the guide track.

The second handle 404 includes a second handle grip 408 extending in a third general direction away from the handle joint 410. The handle joint 410 constrains motion of the second handle 404 with reference to the first handle 402 to rotation about the handle joint 410. The second handle 404 further includes a drive finger 424 extending in a fourth general direction away from the handle joint 410 and oriented within a receiving slot (not shown) of the tool 400. The drive finger 424 engages a drive socket 426 in the guide follower on the second paddle 414. This permits rotation of the second handle grip 408 about the handle joint 410 to drive a similar rotation of the drive finger 424. The rotation of the drive finger 424 drives a linear motion of the drive socket 426 in the guide follower along the guide track, which yields a similar linear motion of the second paddle 414 with reference to the first paddle 412.

To achieve the depicted closed position, the second handle grip 408 is moved away from the first handle grip 406 (e.g., by action of gravity, inward pressure on the paddles 412, 414 from the brake pistons, separation force caused by a user, or a spring-loaded mechanism with the tool 400), the drive finger 424 rotates up and backward within the drive socket 426 causing the guide follower and the second paddle 414 fixed to it to move forward or distally away from the handle side of the caliper piston tool 400 and towards the first paddle 412 on a distal side of the tool 400. Generally, the closer the handle grips 406, 408 are to one another, the farther the paddles 412, 414 will be from one another. Conversely, the further the handle grips 406, 408 are from one another, the closer the paddles 412, 414 will be to one another.

Figure 5:
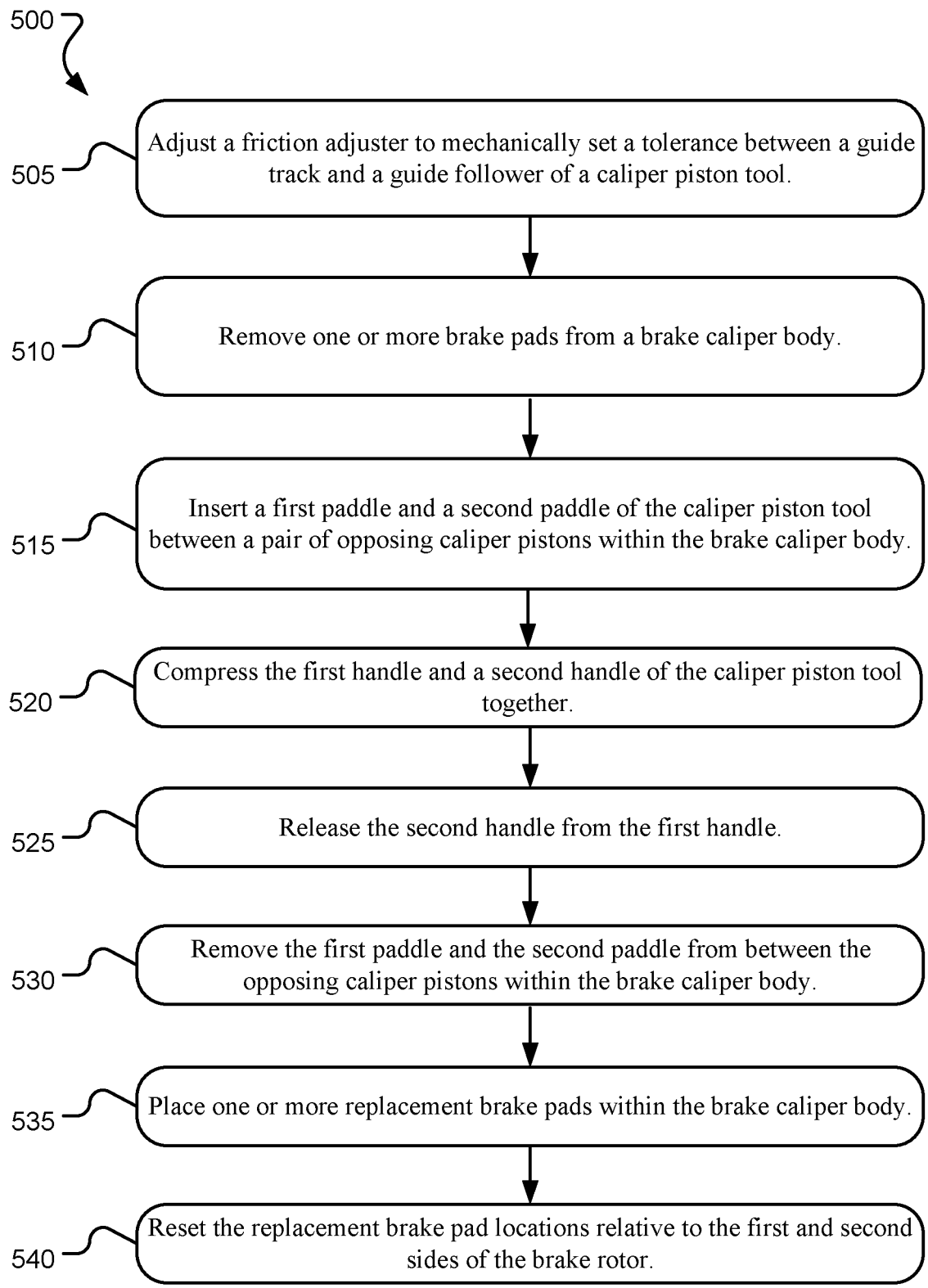
FIG. 5 is a flowchart of example operations for using a caliper piston tool.

FIG. 5 is a flowchart of example operations 500 for using a caliper piston tool. In an adjusting operation 505, a user adjusts a friction adjuster to mechanically set a tolerance between a guide track and a guide follower of the caliper piston tool. The tolerance between the guide track and the guide follower defines a resistance of the caliper piston tool to change state between an open position (as illustrated in FIG. 3) and a closed position (as illustrated in FIG. 4). In a removal operation 510, the user removes one or more brake pads from a brake caliper body. The brake caliper body is associated with a disc brake assembly for a vehicle, such as a bicycle, automobile, motorcycle, scooter, all-terrain vehicle (ATV), side-by-side (SxS), and electric mobility vehicle.

In an inserting operation 515, the user inserts a first paddle and a second paddle of the caliper piston tool between a pair of opposing caliper pistons within the brake caliper body. In various implementations, the first paddle is fixed in position on a first handle of the caliper piston tool and the first handle includes the guide track as well. In an example implementation where the brake caliper body is still installed on a brake rotor and when the inserting operation 515 is performed, the first paddle is inserted between a first brake piston within the brake caliper body and a first side of a brake rotor and the second paddle is inserted between a second brake piston within the brake caliper body and a second side of the brake rotor. In various implementations, the inserting operation 515 may be accomplished with or without removing a corresponding wheel and tire from the vehicle, with or without removing the brake caliper body from the brake rotor, and with or without corresponding brake pads remaining in place on the opposing caliper pistons.

In a compressing operation 520, the user compresses the first handle and a second handle of the caliper piston tool together. The compressing operation 520 causes the second handle to pivot about the first handle at a handle joint. The second handle includes a drive finger fixed in position on the second handle. The second paddle includes a drive socket and the drive finger is engaged within the drive socket. The guide follower is constrained to linear motion along the guide track, as rotation of the drive finger about the handle joint drives a linear motion of the guide follower along the guide track and separation of the first paddle and the second paddle in response to the compressing operation 520. In various implementations, the compressing operation 520 re-positions the caliper piston tool from the closed position (as illustrated in FIG. 4) to the open position (as illustrated in FIG. 3).

In various implementations, the first handle further includes a first handle grip and the second handle further includes a second handle grip and to execute the compressing operation 520, the user squeezes the first and second handle grips together to induce rotation of the second handle about the first handle. Further, the compressing operation 520 may push the first piston within the brake caliper body away from the first side of the brake rotor and the second piston within the brake caliper body away from the second side of the brake rotor. The compressing operation 520 may uniformly apply outward pressure on the pistons thus moving the pistons to a position sitting flush with interior walls within the brake caliper body.

In a releasing operation 525, the user releases the second handle from the first handle. A biasing force, gravity, or user manipulation of the first and second handle grips may cause an opposite rotation of the second handle about the first handle. This drives a corresponding opposite rotation of the drive finger about the handle joint to drive an opposite linear motion of the guide follower along the guide track, thus moving the first paddle and the second paddle back together. In various implementations, the compressing operation 520 re-positions the caliper piston tool from the open position (as illustrated in FIG. 3) to the closed position (as illustrated in FIG. 4).

In a removing operation 530, the user removes the first paddle and the second paddle from between the opposing caliper pistons within the brake caliper body. In an inserting operation 535, the user places one or more replacement brake pads within the brake caliper body. In a resetting operation 540, the user resets the replacement brake pad locations relative to the first and second sides of the brake rotor by pumping on a brake system actuator for the vehicle.

The logical operations making up the embodiments of the invention described herein may be referred to variously as operations, steps, objects, or modules. Furthermore, it should be understood that logical operations may be performed in any order, adding or omitting operations as desired, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A caliper piston tool comprising:
a first handle including a guide track and a first paddle fixed in position on the first handle;
a second handle to pivot about the first handle at a handle joint, the second handle including a drive finger fixed in position on the second handle; and
a second paddle including:
a drive socket, wherein the drive finger is engaged within the drive socket, and
a guide follower constrained to linear motion along the guide track, wherein rotation of the drive finger about the handle joint drives a linear motion of the guide follower along the guide track.

2. The caliper piston tool of claim 1, wherein the first handle further includes a first handle grip and the second handle further includes a second handle grip, wherein a rotation of the second handle about the first handle that brings the first handle grip and the second handle grip together separates the first paddle and the second paddle.

3. The caliper piston tool of claim 2, wherein a rotation of the second handle about the first handle that separates the first handle grip from the second handle grip brings the first paddle and the second paddle together.

4. The caliper piston tool of claim 2, wherein the caliper piston tool includes a handle stop, wherein the rotation of the second handle about the first handle that brings the first handle grip and the second handle grip together is limited by contact between the first handle and the second handle at the handle stop.

5. The caliper piston tool of claim 1, wherein the linear motion of the guide follower along the guide track causes a parallel movement of the second paddle with reference to the first paddle.

6. The caliper piston tool of claim 1, further comprising:
a friction adjuster to mechanically set a tolerance between the guide track and the guide follower.

7. The caliper piston tool of claim 6, wherein the friction adjuster includes aligned apertures through the first handle and the second paddle and a fastener extending therethrough.

8. The caliper piston tool of claim 1, wherein the first handle forms a receiving slot, and a portion of the second handle is oriented within the receiving slot.

9. The caliper piston tool of claim 1, wherein the first paddle forms a flush front face of the caliper piston tool.

10. The caliper piston tool of claim 1, wherein the first paddle and the second paddle each include a chamfered leading edge.

11. The caliper piston tool of claim 1, wherein a shaft extends through aligned apertures in the first handle and the second handle forming a plain bearing at the handle joint.

12. The caliper piston tool of claim 1, further comprising:
a biasing element to bias rotation of the second handle about the first handle to bring the first paddle and the second paddle together.

13. A method of using a caliper piston tool comprising:
inserting a first paddle and a second paddle between a pair of opposing caliper pistons, the first paddle fixed in position on a first handle, the first handle including a guide track; and
compressing the first handle and a second handle together, the second handle to pivot about the first handle at a handle joint, and the second handle including a drive finger fixed in position on the second handle, wherein the second paddle includes:
a drive socket, wherein the drive finger is engaged within the drive socket, and
a guide follower constrained to linear motion along the guide track, wherein rotation of the drive finger about the handle joint drives a linear motion of the guide follower along the guide track and separation of the first paddle and the second paddle.

14. The method of claim 13, wherein the first handle further includes a first handle grip and the second handle further includes a second handle grip, wherein the compressing operation includes rotation of the second handle about the first handle.

15. The method of claim 13, further comprising:
releasing the second handle from the first handle, wherein rotation of the drive finger about the handle joint drives an opposite linear motion of the guide follower along the guide track and contact between the first paddle and the second paddle.

16. The method of claim 15, wherein the first handle further includes a first handle grip and the second handle further includes a second handle grip, wherein the releasing operation includes rotation of the second handle about the first handle.

17. The method of claim 15, further comprising:
removing the first paddle and the second paddle from between the pair of opposing caliper pistons.

18. The method of claim 13, further comprising:
adjusting a friction adjuster to mechanically set a tolerance between the guide track and the guide follower.

19. A caliper piston tool comprising:
a first handle including a guide track and a first paddle fixed in position as a flush front face of the caliper piston tool;
a second handle to pivot about the first handle at a handle joint, the second handle including a drive finger fixed in position on the second handle; and
a second paddle including:
a drive socket, wherein the drive finger is engaged within the drive socket, and
a guide follower constrained to linear motion along the guide track, wherein rotation of the drive finger about the handle joint drives a linear motion of the guide follower along the guide track, and
a friction adjuster including aligned apertures through the first handle and the second paddle and a fastener extending therethrough, the friction adjuster to mechanically set a tolerance between the guide track and the guide follower.

20. The caliper piston tool of claim 19, wherein the first handle further includes a first handle grip and the second handle further includes a second handle grip, wherein a rotation of the second handle about the first handle that brings the first handle grip and the second handle grip together separates the first paddle and the second paddle.

* * * * *